C. D. LOCKMAN AND C. POSTEL, Jr.
UTENSIL LIFTER.
APPLICATION FILED NOV. 5, 1920.
1,435,405.
Patented Nov. 14, 1922.
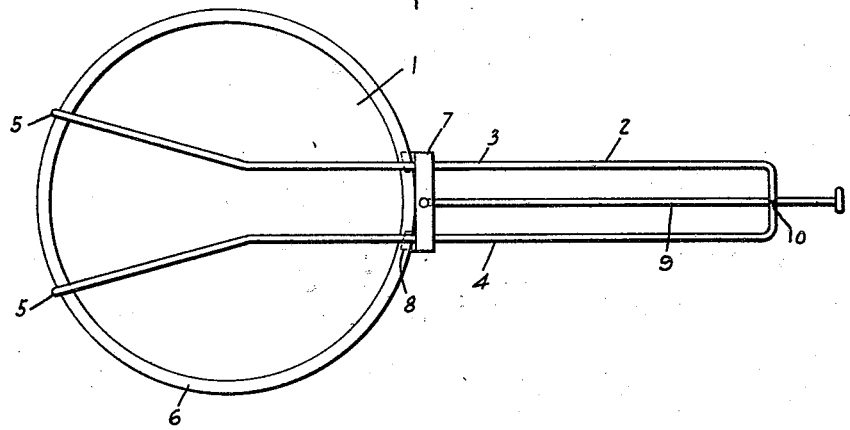
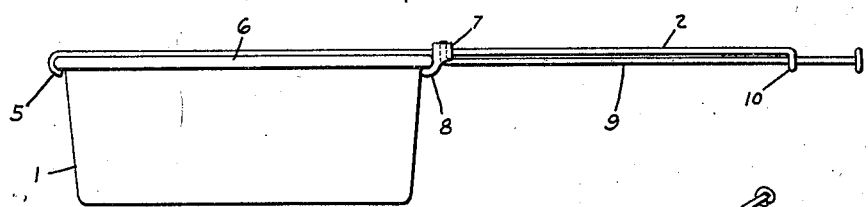
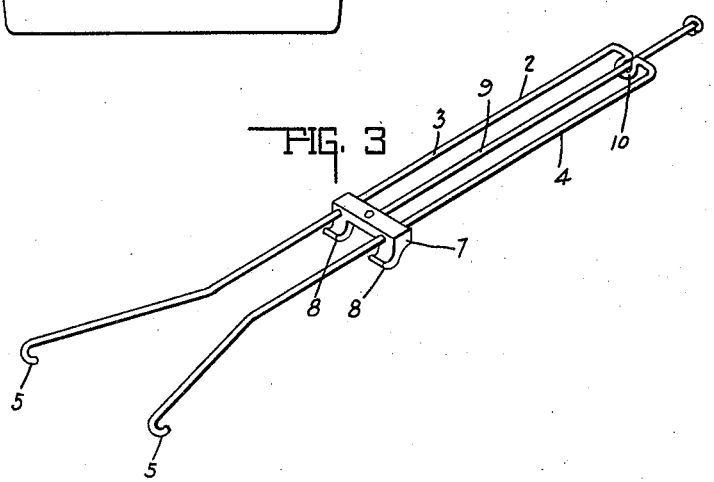
INVENTOR.
CHARLES D. LOCKMAN.
CHARLES POSTEL, JR.
BY
ATTORNEY.

Patented Nov. 14, 1922.

1,435,405

UNITED STATES PATENT OFFICE.

CHARLES D. LOCKMAN AND CHARLES POSTEL, JR., OF INDIANAPOLIS, INDIANA, ASSIGNORS OF ONE-THIRD TO HARRY C. KROM, OF INDIANAPOLIS, INDIANA.

UTENSIL LIFTER.

Application filed November 5, 1920. Serial No. 422,003.

*To all whom it may concern:*

Be it known that we, CHARLES D. LOCKMAN and CHARLES POSTEL, Jr., citizens of the United States, residing at Indianapolis, in the county of Marion and State of Indiana, have invented certain new and useful Improvements in Utensil Lifters, of which the following is a specification.

This invention relates to utensil lifters and is designed primarily for lifting utensils from ovens or from over burners while food is being cooked in the utensil, the main feature of the invention being the provision of an elongated handle construction having parts thereon for interlocking with the edges of the utensil so that the hands of the attendant will be a considerable distance from the heat and the possibility of burning the hands of the attendant reduced to a minimum.

A further feature of the invention is the provision of a sliding member which preferably locks by friction after it is engaged with the utensil and a lifting action given to the handle.

A further feature of the invention is the provision of means for shifting the movable part of the lifter whereby the lifter may be attached to utensils of varying diameters.

Other objects and advantages will be hereinafter more fully set forth and pointed out in the accompanying specification.

In the accompanying drawings which are made a part of this application,

Figure 1 is a top plan view of the lifter as applied to use,

Figure 2 is a side elevation thereof, and

Figure 3 is a perspective view of the lifter removed from the utensil.

Referring to the drawings, 1 indicates a utensil which may be constructed in the usual or any preferred form and of that class used for general cooking purposes, and 2 indicates a handle construction which is preferably constructed of wire and bent to substantially U-shape, so as to provide paralleling arms 3 and 4, the free ends of said arms having terminals 5 which engage parts of the utensil, such as the bead or flange 6 at the top edge of the utensil. Slidably mounted on the paralleling arms 3 and 4 is a cross head 7, said cross head having depending fingers 8 which, like the terminals 5, engage parts of the utensil 1, and on the side of the utensil diametrically opposite from the terminals, the fingers 8 being preferably so attached that when a lifting action is given on the handle construction the weight of the utensil will cause the cross head to frictionally grip the arms 3 and 4 and hold the cross head in fixed position adjacent the edge of the utensil.

Any suitable means may be provided for moving the cross head towards or from the edge of the utensil, but for convenience a rod 9 is attached at one end to the cross head while the opposite end thereof passes through a loop 10 in the connecting end portion of the handle construction, said loop being formed in any suitable manner, as by crimping a portion of the wire forming the handle construction at its integral end.

In applying the lifting device to use, the rod 9 is given an outward pull which moves the cross head 7 outwardly and increases the space between the terminals 5 and the fingers 8, so that said terminals and fingers may be positioned at the opposite edges of a utensil, the arms 3 and 4 passing above the utensil. After the terminals and fingers have been properly positioned on opposite sides of the utensil the rod 9 is moved inwardly which forces the fingers 8 against one face of the utensil and a continued forward movement thereof drawing the terminals 5 against the opposite face of the utensil, and in instances where the utensil is provided with a bead or flange at its upper edge the terminals and fingers will interlock therewith. As soon as a lifting action is imparted to the handle construction the cross head will be caused to bind on the arms 3 and 4 in view of the fact that said arms pass through openings in the cross head and said binding action is sufficient under substantially all conditions for holding the cross head in adjusted position adjacent the edges of the utensil.

The handle construction may be attached to the utensil without necessarily bringing the hands of the operator in close proximity to the utensil, thereby avoiding any possibility of being burned while handling the utensil, and as soon as the utensil has been removed and deposited at any suitable point an outward pull on the rod 9 will release the cross head and permit the handle construction to be disengaged from the utensil.

Having thus fully described our said invention, what we claim as new and desire to secure by Letters Patent, is:

A utensil lifter comprising a handle construction formed of paralleling arms integral at one end and having hook terminals at their opposite ends, a rigid cross head slidably mounted on said handle construction, the paralleling arms passing through openings in said head adjacent its ends, a finger depending from each end of said cross head substantially in alignment below said arms adapted to engage the utensil at points substantially diametrically opposite said terminals, the engagement of said fingers with the utensil causing the cross head to cant and frictionally grip the arms of the handle construction for holding the cross head against casual movement on the handle construction, a loop formed by bending parts of the integral end of the handle construction and an operating rod passing through said loop and having one of its ends attached to said cross head.

In witness whereof, we have hereunto set our hands and seals at Indianapolis, Indiana this 30th day of October, A. D. nineteen hundred and twenty.

CHARLES D. LOCKMAN. [L. S.]
CHARLES POSTEL, JR. [L. S.]

Witnesses:
CAREY S. FRYE,
M. L. SHULER.